June 7, 1966   F. FINGER   3,254,743
ADJUSTABLE ENGINE BRAKE
Filed April 19, 1963   4 Sheets-Sheet 1

June 7, 1966 F. FINGER 3,254,743
ADJUSTABLE ENGINE BRAKE
Filed April 19, 1963 4 Sheets-Sheet 2

June 7, 1966 F. FINGER 3,254,743
ADJUSTABLE ENGINE BRAKE
Filed April 19, 1963 4 Sheets-Sheet 3

June 7, 1966  F. FINGER  3,254,743
ADJUSTABLE ENGINE BRAKE
Filed April 19, 1963  4 Sheets-Sheet 4
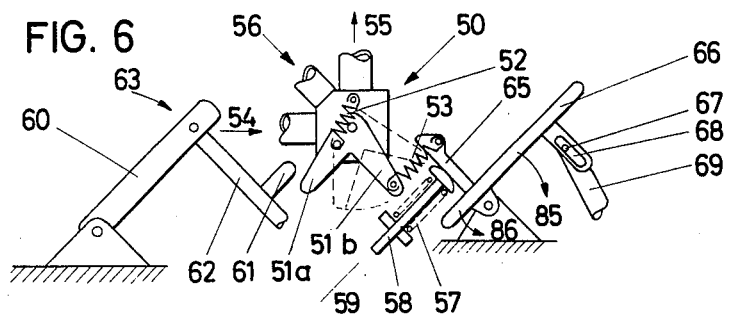
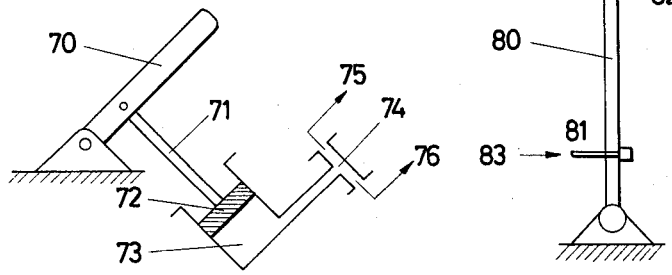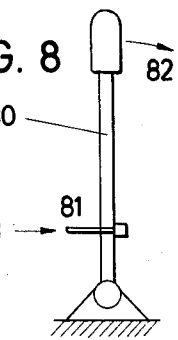
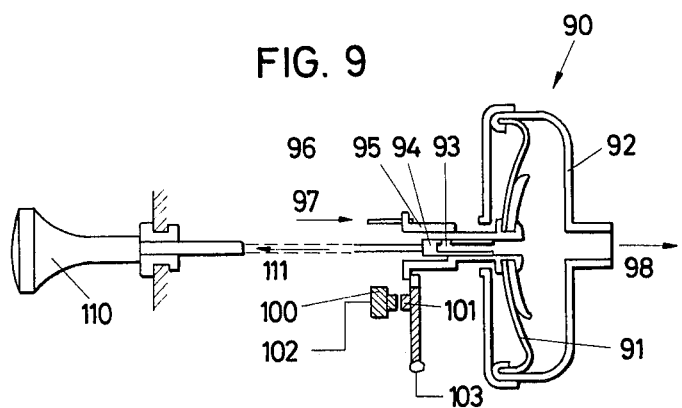

United States Patent Office 3,254,743
Patented June 7, 1966

3,254,743
ADJUSTABLE ENGINE BRAKE
Friedrich Finger, Mittelstrasse, Neureut, near
Karlsruhe, Germany
Filed Apr. 19, 1963, Ser. No. 274,179
Claims priority, application Germany, Apr. 19, 1962,
F 36,593
12 Claims. (Cl. 192—3)

The present invention relates to an adjustable engine brake for an internal combustion engine and especially for the engine of a motor vehicle.

Engine brakes for motor vehicles, numerous types of which are already known, are employed for supplementing the normal service brakes of the vehicles and for amplifying their effect or for exerting by themselves such a braking effect upon the vehicles especially during longer downhill drives that the normal brakes do not need to be applied to maintain complete control over the vehicle. The service brakes generally consist of normal wheel or transmission brakes which are operated by foot pedals. The pedal arrangements of motor vehicles are usually designed so that, when the service brakes are actuated, the fuel supply is automatically throttled to the amount which is required for keeping the engine from stalling while idling. The braking effect of the service brakes is then amplified by the resistances of the idling engine and the power-transmitting elements. These resistances and the braking power of the engine are caused primarily by friction. The braking effect of the engine may, however, be considerably increased if its compression is utilized for destroying the kinetic energy of the moving vehicle or engine. For this purpose it is necessary to eject the compressed charge at the end of each compression stroke to the outside so that the energy which is stored up in this charge will no longer be used to transform the compressing stroke of the piston to the upper dead center position into an acceleration of the piston to the lower dead center position. Such an increase in the braking effect is especially of importance in an idling engine of the two-cycle type since the normal braking effect of such an engine is very small.

An engine brake of an internal combustion engine, especially when mounted in a motor vehicle, should comply with the following requirements:

1. It must permit the compression pressure of the engine to be released to the outside near the upper dead center position of the piston and substantially to the atmospheric pressure.

2. The control of the operation of the brake valve must not require any complicated, expensive, and trouble-causing external means.

3. The brake valve must be designed so as to permit the braking effect of the engine brake to be adjustable.

4. The brake valve must be designed so as also to permit its application on a smaller engine.

5. The presence of the brake valve should not interfere with the normal functions of the engine.

6. The installation of the brake valve should not require or result in any changes in the shape of the combustion chamber.

7. The engine brake should be appliable either to a carburetor or diesel engine.

8. It should be applicable either to a two-cycle or four-cycle engine.

9. The operation of the engine brake should in no way interfere with the normal operation and control of the motor vehicle.

10. The engine brake must be safe on the road and in traffic.

11. The engine brake must be safe in operation.

12. It should be possible to start and release as well as to regulate the engine brake by means of the normal control elements of a motor vehicle.

13. It should be possible to install such an engine brake also at any time in an existing engine.

14. The installation of such an engine brake should not involve any difficulties.

15. The use of the engine brake should not cause or be accompanied by any noise or vibrations.

According to the present invention, all of these requirements are fulfilled by the provision of an engine brake, especially for motor vehicles, in which for each cylinder of the engine a brake valve is provided which opens toward the outside and permits the compressed charge to escape when the piston reaches the upper dead-center position during its compression stroke, and in which a spark or glow plug may be mounted in the brake valve and the latter is designed so as to permit it to be screwed into the opening which is provided for the usual spark or glow plug.

A brake valve according to the invention which is designed in the manner as stated above complies with the aforementioned requirements and also has the following advantages:

1. There is no necessity for any additional openings leading through the cylinder head into the combustion chamber.

2. Since the compressed charge when being released from the engine to the outside flows past the electrodes of the spark plug or the filament of the glow plug, the electrodes or the filament will be intensively cooled during the brake operation by the cool unburned gases.

3. The installation of the brake valve according to the invention may be carried out by any unskilled person.

4. The brake valve according to the invention may also be installed at any time on a complete or used engine.

Another important feature of the invention consists in providing the brake valve with an annular piston which is slidable in the longitudinal direction therein and rests in the neutral position under the action of a spring on a valve seat.

Another important feature of the invention consists in designing the bushing containing the body of the spark or glow plug so as to be slidable longitudinally within the annular piston and to engage in the neutral position upon the valve seat and thus to form another movable valve member.

According to another feature of the invention, the bushing in which the spark or glow plug is mounted bears through an intermediate pressure sleeve and a ball bearing upon a rotatable control ring which is slidable longitudinally within a cylinder surrounding the brake valve and is provided with cam projections which are peripherally inclined toward one side and are adapted to engage into corresponding recesses in a stationary control ring when the first control ring is turned for a certain distance about its longitudinal axis and then slides longitudinally under the pressure of the spring which acts upon the annular piston.

The features and advantages of the invention will become more clearly apparent from the following detailed description thereof which is to be read with reference to the accompanying drawings, in which:

FIGURE 6 shows a diagrammatic illustration of an arrangement of the control pedals of a motor vehicle for controlling the operation of the brake valve by servo means;

FIGURE 7 shows a diagrammatic illustration of an arrangement for controlling the operation of the brake valve by the control pedal of a hydraulic brake;

FIGURE 8 shows a diagrammatic illustration of a hand lever for controlling the operation of the brake valve; while FIGURE 9 shows a diagrammatic cross section of a vacuum servo means and its control means for controlling the operation of the brake valve.

Figure 1:
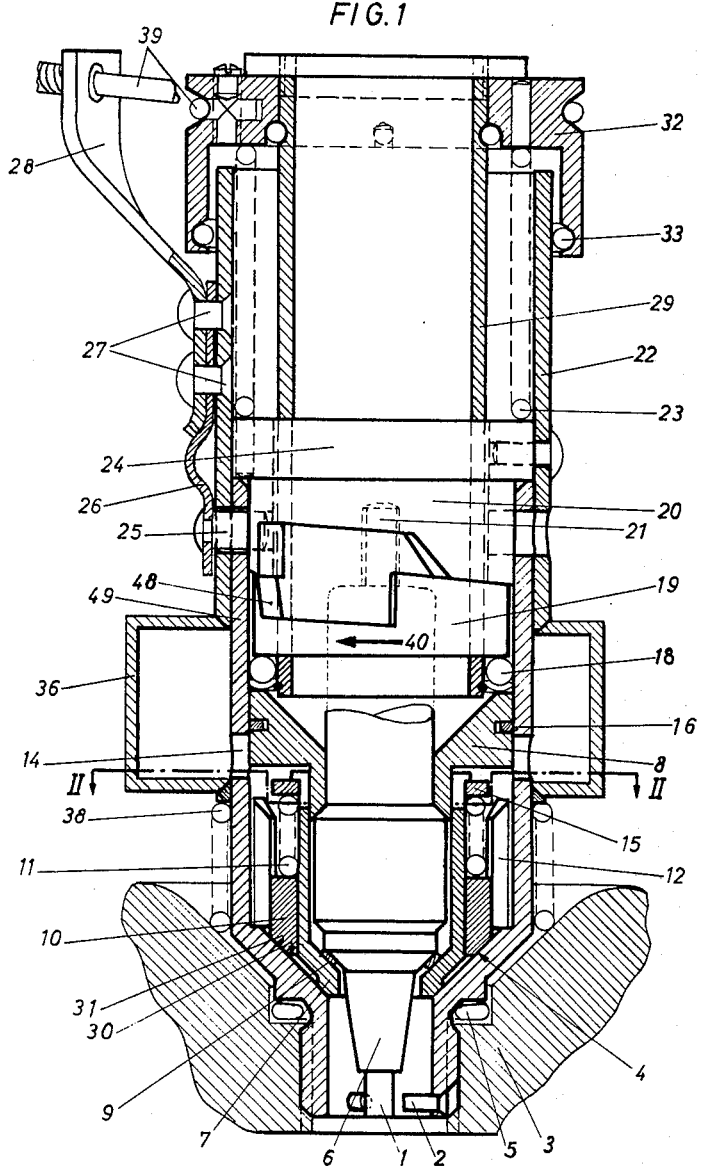
FIGURE 1 shows a central longitudinal section of the brake valve according to the invention.

As illustrated in FIGURE 1 of the drawings, the brake valve according to the invention is screwed at the reduced end of the valve housing 49 into the engine 3 and is sealed thereto by a gasket 5. Valve housing 49 is surrounded by an exhaust receiver 36 which receives the gases emerging from the outlet ports 14 and conducts them through a main outlet to the outside. For absorbing the vibrations and silencing the exhaust, this exhaust receiver 36 is maintained under tension by a spring 38. At the inside of the housing 49 a spark plug 1 is mounted which has a terminal 21 on its upper end. The insulator 6 of spark plug 1 is inserted into a socketlike bushing 7 by means of a gasket 9 and is secured therein by a pressure sleeve 8. In order to attain an accurate fit of this spark plug, the end of bushing 7 opposite to the end facing the combustion chamber is slotted and compressed by a steel ring 15. The pressure sleeve 8 is further provided with a gasket 16 for preventing the unburned gases from emerging between the wall surfaces of sleeve 8 and housing 49. Bushing 7 carries an annular piston 10 which is slidable thereon and pressed by a spring 11 against the conical valve seat 4. This annular piston is provided on the end facing the combustion chamber with a radial surface which even in the neutral position does not engage upon the valve seat and is considerably smaller than the entire end surface of the annular piston. Along its outside piston 10 is guided by slide bars 12 which are separated from each other to form channels through which, when the valve is open, the compressed charge may pass from the combustion chamber to the outlet parts 14. Pressure sleeve 8 bears through a ball bearing 18 upon a rotatable control ring 19 which when turned in the direction of the arrow 40 engages into corresponding recesses in a stationary control ring 20. The rotatable control ring 19 is secured to a control tube 29 which, in turn, has a cable pulley 32 secured to its upper end which is rotatably mounted by means of a ball bearing 33 on a cylindrical housing 22 which contains a coil spring 23 which tends to turn the rotary control ring 19 back to its original position. Pulley 32 carries a Bowden cable 39 the flexible steel conduit of which is secured to a bracket 28. This bracket 28 is, in turn, secured by rivets 27 to the spring housing 22. The two cylindrical housings 22 and 49 are held together by a locking pin 25 which is acted upon by a leaf spring 26.

Figure 2:
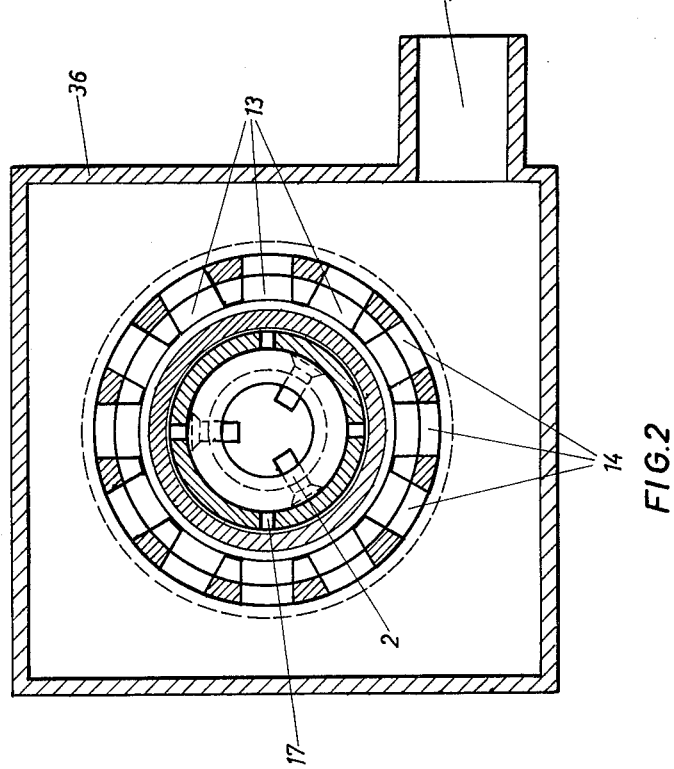
FIGURE 2 shows a cross section which is taken along the line II—II in FIGURE 1.
Figure 5:
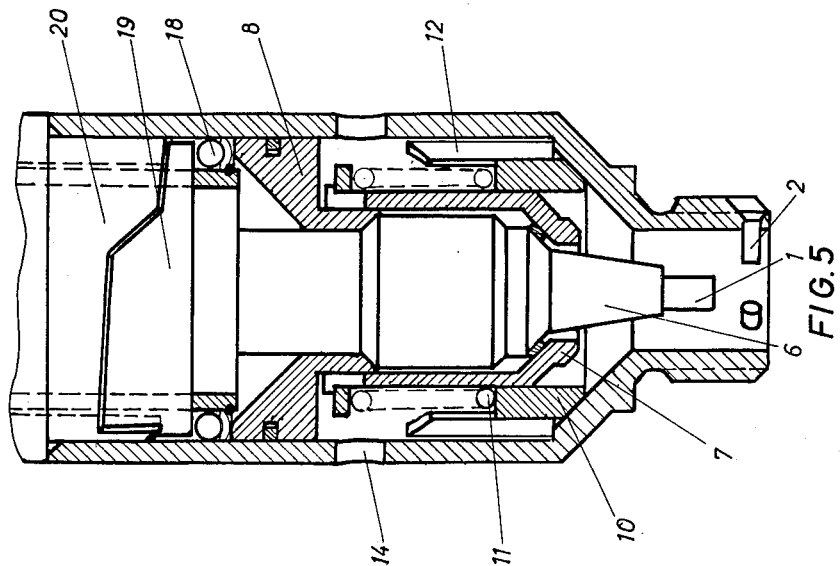
FIGURE 5 shows a view similar to FIGURE 4, but with the bushing in the fully raised position and the annular piston in the closed position.

The cross-sectional view of the brake valve according to FIGURE 2 indicates the channels between the slide bars 12 through which the compressed charge may flow to the outlet parts 14 and through the latter to the inside of the exhaust receiver 36 and then from the latter through the outlet 37 to the outside. For the sake of clarity of the illustration the spark plug 6 is omitted from FIGURE 2.

Figure 3:
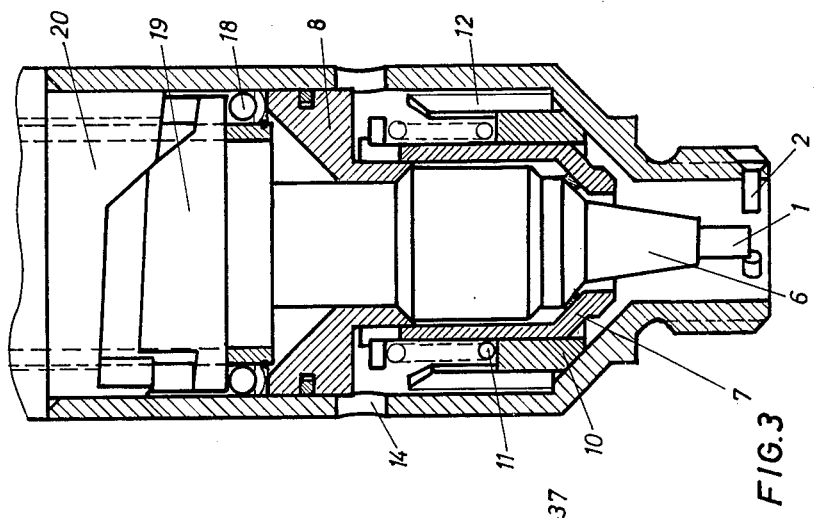
FIGURE 3 shows a view similar to FIGURE 1 of the lower part of the brake valve with the bushing in a partly raised position.

FIGURE 3 illustrates the brake valve in an intermediate position in which the bushing 7 is only lifted to some extent from the valve seat so that only a small gap is formed for the passage of the compressed charge which therefore cannot completely escape to the outside within the allotted time with the result that the braking effect will be smaller than that which is attained when the bushing 7 is fully lifted and the size of the gap between the socket and the valve seat is accordingly increased.

Figure 4:
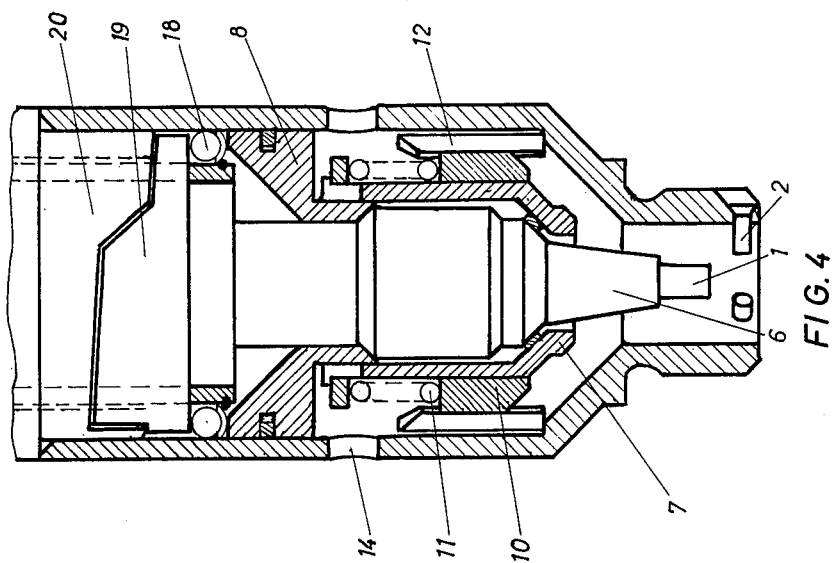
FIGURE 4 shows a view similar to FIGURE 3, but with the bushing and the annular piston in the fully raised positions.

FIGURE 4 shows the brake valve with the bushing 7 in the fully lifted position when the projections on the rotatable control ring 19 are in full engagement with the corresponding recesses in the stationary control ring 20. By the pressure of the compressed charge, the annular piston 10 is then forced back to its upper end position and the compressed charge can pass between the slide bars 12 and through the outlet ports 14 into the exhaust receiver. When the pressure of the compressed gases decreases, the annular piston 10 again returns to its neutral position and engages with the valve seat 4. This valve play is continuously repeated until bushing 7 is again pressed upon the valve seat 4. Thus, when the brake valve is not in operation the inside of the engine cylinder sealed toward the outside by two valve, that is, by socket 7 and by the annular piston 10, and only those parts are exposed to the high combustion temperatures which normally remains the combustion chamber, that is, the main electrode 1 together with the insulator 6 and the ground electrodes 2, whereas the sensitive valve seat 4 and the associated annular piston 10 are completely protected from these temperatures.

One preferred manner of operating the brake valve is illustrated diagrammatically in FIGURE 6, which shows the gas pedal 66 for controlling the fuel supply by adjustable connecting elements 87 to 69. This pedal further carries an arm 65 with a spring 53 thereon which acts upon a bell crank 51a, 51b. When pedal 66 is pivoted in the direction of the arrow 85, the engine is accelerated in the usual manner to drive the vehicle and when it is pivoted in the direction of the arrow 88 beyond the neutral position, a pressure is exerted upon the arm 51b of the bell crank so that the latter is pivoted in the direction as shown. Valve 50 will thereby be adjusted so that the line 56 coming from a vacuum servo means will be connected to the intake line 55. The servo means will thereby be actuated and turn the pulley 32. When the clutch pedal 60 is depressed in the direction of the arrow 63, an arm 82 on this pedal with a projection 61 thereon presses upon the arm 51a of the bell crank and moves the same back to its original position so that the opening 54 leading to the outside will then be connected with the intake line 55 and the vacuum servo means will return to its neutral positon, so that the brake valve will again be closed.

Simultaneously with the actuation of the bell crank by the gas pedal 66 pressure is exerted upon a Bowden cable 57 to 59, whereby a switch is actuated to break the connection to the primary circuit of the ignition. Of course, if the servo arrangement is omitted, this Bowden cable 57 to 59 may also be used for controlling the brake valve directly, although in such a case a considerably greater force will be required for returning the gas pedal 66 to its neutral position in the direction of the arrow 86.

FIGURE 7 shows an engine brake control mechanism for a motor vehicle with an oil-hydraulic brake in which the brake pedal 70 acts through one or more connecting rods 71 upon the master cylinder 72, 73 of the hydraulic brake. The pressure line 74 has a T section for actuating the normal service brakes of the vehicle in the direction of the arrow 75 and also the engine brake in the direction of the arrow 76 through a suitable hydraulic cylinder. The surface area of this hydraulic cylinder for the operation of the engine brake may be made of such dimensions that a small pressure upon the brake pedal 70 will suffice to actuate the hydraulic cylinder and thus to start the operation of the engine brake. When the brake pedal 70 is further depressed, the normal brake system will also be actuated and its braking effect will then be amplified by that of the engine brake.

FIGURE 8 shows diagrammatically a hand lever 80 which may be employed in place of a control knob for actuating the engine brake by means of a Bowden cable 81. This hand lever may of course, be provided with suitable ratchet means or the like to permit it to be arrested in different positions corresponding to different braking effects of the engine brake.

FIGURE 9 illustrates the combination of a control of the braking force of the engine brake by a manually actuated Bowden cable with a vacuum servo means. When the control knob 110 of the Bowden cable is drawn in the direction of the arrow 111, valve 94 will be actuated to close the opening 93. The outlet 98 is connected to the intake line of the combustion engine through a valve, not shown, so that when this valve is in the proper position, a vacuum will be produced in the chamber 92 whereby the diaphragm 91 will be moved in the direction of the arrow 97. The entire part 95 as well as the Bowden cable 96 which is connected to the pulley of the brake valve will thereby be shifted in the same direction so that the brake valve may then start to operate. Part 94 will then be moved in the direction of the arrow 97 to an extent depending upon the adjustment of the Bowden cable 110 and will thereby turn the pulley of the brake valve accordingly. The braking effect of the engine is thus continuously variable. By means of a projection part 95 also takes along a contact member 101 which in its neutral position engages with a countercontact 100. The conductors 102 and 103 leading to the contacts 100 and 101 are connected to the primary circuit of the ignition. When the vacuum servo means 90 is actuated the electric connection 100 to 103 will therefore be broken and the primary circuit of the ignition be interrupted before the brake valve is opened.

Although my invention has been illustrated and described with reference to the preferred embodiments thereof, I wish to have it understood that it is in no way limited to the details of such embodiments, but is capable of numerous modifications within the scope of the appended claims.

Having thus finally disclosed my invention, what I claim is:

1. For use with an internal combustion engine comprising having at least one cylinder, a brake valve comprising a valve housing an inlet opening adapted to communicate with a cylinder of the internal combustion engine and having outlet openings, and valve means movable within said housing and adapted to be opened towards said outlet openings to the outside to allow the compressed charge to escape from a cylinder with which said inlet opening communicates when the engine piston in said cylinder reaches the upper dead-center position of its compression stroke, said valve means comprising a bushing mounted for longitudinal movement in said housing, an ignition plug mounted in said bushing, said housing having a valve seat therein at a point between the inlet and outlet openings, a piston slidably mounted on the outside of said bushing and having a part engageable with said valve seat to close off communication between the inlet opening and the outlet openings and spring means between the bushing and the piston urging said piston into engagement with said valve seat.

2. For use with an internal combustion engine having at least one cylinder, a brake valve comprising a substantially cylindrical valve housing having an inlet opening adapted to communicate with a cylinder of the internal combustion engine and having outlet openings, and valve means within said housing adapted to be opened toward said outlet openings to the outside to allow the compressed charge to escape from a cylinder with which said inlet opening communicates when the engine piston in said cylinder reaches the upper dead-center position of its compression stroke, said valve housing having a threaded end portion adapted to be screwed into said cylinder, a bushing mounted within said housing, an ignition plug removably secured in said bushing and having electrode means projecting into said end portion of said housing, said valve means comprising a conical valve seat rigid with said housing, an annular piston surrounding and slidable longitudinally along said bushing in said housing and having at one end a first annular surface conically inclined in accordance with said valve seat and adapted to engage thereon and also having at said end a second annular surface extending substantially at right angles to the axis of said annular piston and not engaging with said valve seat when said first surface engages thereon, said second surface being smaller than said conical first surface, and spring means in said housing acting upon said annular piston and tending to press the same toward said valve seat.

3. For use with an internal combustion engine having at least one cylinder, a brake valve comprising a substantially cylindrical valve housing having an inlet opening adapted to communicate with a cylinder of the internal combustion engine and having outlet openings, and valve means within said housing adapted to be opened toward said outlet openings to the outside to allow the compressed charge to escape from a cylinder with which said inlet opening communicates when the engine piston in said cylinder reaches the upper dead-center position of its compression stroke, said valve housing having a threaded end portion adapted to be screwed into said cylinder, a bushing mounted within said housing and slidable longitudinally therein, an ignition plug removably secured in and movable together with said bushing and having electrode means projecting into said end portion of said housing, said valve means comprising a conical valve seat rigid with said housing and adjacent to said end portion thereof, an annular piston surrounding and slidable longitudinally along the outer wall of said bushing in said housing and having at one end a first annular surface conically inclined in accordance with said valve seat and adapted to engage thereon, and a second annular surface extending inwardly from said first surface and substantially at right angles to the axis of said annular piston and not adapted to engage with said valve seat even when said first surface engages thereon, said second surface being smaller than said conical first surface, spring means in said housing acting upon said annular piston and tending to press the same toward said valve seat, said bushing also having at one end an annular surface conically inclined in accordance with said valve seat and adapted to engage thereon, said spring means also acting upon said bushing and tending to lift said bushing off said valve seat, and control means adapted to press said bushing against the action of said spring means upon said valve seat when said brake valve is not to be operated.

4. An engine brake as defined in claim 3, in which said control means comprise an annular pressure member connected to said ignition plug within said bushing and slidable with said bushing and said ignition plug longitudinally within said housing under the action of said spring means upon said bushing, a ball bearing mounted on said pressure member, a stationary control ring and a movable control ring rotatable and slidable longitudinally within said housing relative to said stationary ring, said movable control ring having one substantially plane end engaging and rotatable on said ball bearing and the opposite end continuously engaging under the action of said spring means upon the adjacent end of said stationary control ring, said adjacent ends of said rings having corresponding camlike projections and recesses inclined toward one side in the peripheral direction of said rings and adapted to slide along each other, and means for turning said control ring back and forth about its axes between two end positions whereby when said movable control ring is turned to one end position, it presses said bushing through said ball bearing, said pressure member, and said ignition plug tightly upon said valve seat, and when said movable control ring is turned from said position toward the other end position, said bushing is at first lifted off said valve seat under the action of said spring means so as gradually to increase the gap between said bushing and said valve seat until when said control ring approaches said other end position said projections and recesses on said rings engage with each other and allow said bushing under the action of said spring means to be quickly further lifted to the maximum distance from said valve seat.

5. An engine brake as defined in claim 4, in which said means for turning said movable control ring comprise a tubular member secured to said movable control ring, and extending through the inside of said stationary control ring to and beyond the upper end of said housing, a pulley rotatably mounted on the upper end of said housing and secured to the upper end of said tubular member, and a Bowden cable connected to said pulley for turning the same back and forth relative to said housing.

6. An engine brake as defined in claim 4, in which said means for turning said movable control ring comprise a tubular member secured to said movable control ring and rotatably mounted on said housing and extending through the inside of said stationary control ring to and beyond the upper end of said housing, servo means connected to the upper end of said tubular member for turning the same back and forth about its axis relative to said housing, and control means for actuating said servo means.

7. In combination with an internal combustion engine with at least one cylinder, an engine brake as defined in claim 6, fuel supply means for said engine, a control member connected to said fuel supply means for adjusting the same, means for connecting said control member to said control means for actuating said servo means, and means for preventing the engine brake from operating at any time except when said control member is in a position in which said fuel supply means are supplying said engine only with the amount of fuel required for idling of said engine.

8. In a combination as claimed in claim 7, a clutch for said engine, and means connecting said clutch to said control means for returning said control means to the neutral position when said clutch is moved to its disengaged position.

9. In combination with a motor vehicle having an oil-hydraulic brake comprising a master brake cylinder and a brake pedal for acting upon said master cylinder, brake means, a pressure line connecting said master cylinder to said brake means, said vehicle having an internal combustion engine with at least one cylinder, an engine brake as defined in claim 6, and means for connecting said servo means to said pressure line.

10. In combination with an internal combustion engine having at least one cylinder and a carburetor, an intake line connecting said carburetor to said engine, a valve member connected to said intake line and adapted to be opened to the outside, an engine brake as claimed in claim 6, said control means for actuating said servo means comprising a valve member, and a control member connected to both valve members for opening the same substantially at the same time.

11. An engine brake as defined in claim 3, in which said ignition plug comprises a plug body removably secured in said bushing and having an insulator thereon, said electrode means comprising a main electrode projecting from said insulator into said end portion and coaxial therewith, and a plurality of ground electrodes, said end portion having a plurality of radial bores therein, said ground electrodes secured in said bores but removable therefrom, the free end of said main electrode extending between the inner ends of said ground electrodes and spaced at such a short distance therefrom when said bushing engages on said valve seat that sparks may be formed between said main electrode and said ground electrodes, said free end of said main electrode being spaced at a larger distance from the inner ends of said ground electrodes when said bushing carrying said ignition plug is lifted off said valve seat so that sparks can then not be formed between said main electrode and said ground electrodes.

12. An engine brake as defined in claim 1, in which said ignition plug comprises a plug body removably secured in said housing and having an insulator thereon, and a main electrode projecting from said insulator into said end portion of said housing, said end portion having a plurality of radial bores therein, and rivetlike ground electrodes tightly fitted into said bores but removable therefrom.

References Cited by the Examiner

UNITED STATES PATENTS

| | | | |
|---|---|---|---|
| 1,139,917 | 5/1915 | Strasburger | 123—198 |
| 1,890,790 | 12/1932 | Messinger | 192—3 |
| 1,951,279 | 3/1934 | Goodwin | 123—198 |
| 2,124,081 | 7/1938 | Rauen et al. | 123—97 |
| 2,338,244 | 1/1944 | Hayes | 192—3 |
| 2,968,295 | 1/1961 | Haller | 123—97 |

FOREIGN PATENTS 1,007,110   4/1957   Germany.

MARK NEWMAN, *Primary Examiner.*

LAURENCE M. GOODRIDGE, *Examiner.*